(12) United States Patent
Tsuji

(10) Patent No.: US 9,027,255 B2
(45) Date of Patent: May 12, 2015

(54) MICROMETER

(71) Applicant: Mitutoyo Corporation, Kawasaki-shi, Kanagawa (JP)

(72) Inventor: Shozaburo Tsuji, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 190 days.

(21) Appl. No.: 13/837,217

(22) Filed: Mar. 15, 2013

(65) Prior Publication Data

US 2013/0276319 A1 Oct. 24, 2013

(30) Foreign Application Priority Data

Apr. 23, 2012 (JP) ................................. 2012-097497

(51) Int. Cl.
*G01B 3/18* (2006.01)

(52) U.S. Cl.
CPC ........................................ *G01B 3/18* (2013.01)

(58) Field of Classification Search
CPC ........................................................ G01B 3/18
USPC ............................................ 33/815, 831, 813
See application file for complete search history.

(56) References Cited

U.S. PATENT DOCUMENTS

| | | | | |
|---|---|---|---|---|
| 5,433,015 A * | 7/1995 | Mazenet | ........................... | 33/815 |
| 5,495,677 A * | 3/1996 | Tachikake et al. | .............. | 33/784 |
| 6,178,658 B1 * | 1/2001 | Koga | ................................ | 33/831 |
| 6,247,244 B1 * | 6/2001 | Zanier et al. | ..................... | 33/819 |
| 6,260,286 B1 * | 7/2001 | Suzuki et al. | ................... | 33/813 |
| 6,463,671 B1 * | 10/2002 | Saeki | ................................ | 33/815 |
| 2009/0072502 A1 * | 3/2009 | Weller et al. | ..................... | 279/63 |
| 2011/0252659 A1 * | 10/2011 | Tsuji | ................................ | 33/815 |
| 2014/0041458 A1 * | 2/2014 | Smith | ............................. | 73/856 |

FOREIGN PATENT DOCUMENTS

| | | |
|---|---|---|
| DE | 103 22 357 A1 | 12/2004 |
| JP | A-58-002605 | 1/1983 |
| JP | A-09-049720 | 2/1997 |
| JP | A-2000-088503 | 3/2000 |
| JP | A-2011-220787 | 11/2011 |

OTHER PUBLICATIONS

Jun. 3, 2013 Extended Search Report issued in European Application No. 13162416.5.

* cited by examiner

*Primary Examiner* — Christopher Fulton
(74) *Attorney, Agent, or Firm* — Oliff PLC

(57) ABSTRACT

A micrometer includes: a frame; an anvil; a spindle; an encoder; a display; a strain gauge that detects a deformation of the frame; a storage that stores a change amount of the detection value (a displacement of the spindle detected by the encoder) per a unit deformation detected by the strain gauge, as a compensation factor; and a compensator that compensates the detection value based on a difference between a zeroset-time deformation that is detected by the strain gauge when a command for zeroset is given and a measurement-time deformation that is detected by the strain gauge in measurement, and based on the compensation factor stored in the storage.

5 Claims, 7 Drawing Sheets

MICROMETER

The entire disclosure of Japanese Patent Applications No. 2012-097497 filed Apr. 23, 2012 is expressly incorporated by reference herein.

BACKGROUND OF THE INVENTION

1. Field of the Invention

The present invention relates to a micrometer for measuring a dimension or the like of an object to be measured based on an axial displacement of a spindle.

2. Description of Related Art

A micrometer using a lead screw has been known as one of displacement measuring instruments.

The micrometer includes: a U-shaped frame; an anvil fixed to one end of the frame; a spindle that is screwed to the other end of the frame and is advanced and retracted relative to the anvil; an encoder that detects a displacement of the spindle; and a display that displays a measurement value obtained by processing a detection value detected by the encoder.

Among the micrometers, there has been known a micrometer including a constant pressure device for stabilizing a measurement force of the spindle (see, for instance, Patent Literature 1: JP-A-2011-220787).

The typical micrometer including the constant pressure device can measure by a substantially constant measurement force. However, practically, the measurement force varies to some extent.

Particularly, when an attitude of the micrometer at zeroset (where the spindle is brought into contact with the anvil and a display value is set at zero) is different from an attitude of the micrometer in measurement, for instance, when the attitude of the micrometer at zeroset is horizontal and the attitude of the micrometer in measurement is vertical, a weight of the spindle is added to the measurement force. Then, a deformation of the frame varies to cause a difference between a deformation of the frame at zeroset and a deformation of the frame in an actual measurement. Accordingly, repeatability of the micrometer is deteriorated to cause a measurement error.

SUMMARY OF THE INVENTION

An object of the invention is to solve the above typical problems and provide a micrometer having an improved repeatability and reduced measurement errors.

According to an aspect of the invention, a micrometer includes: a U-shaped frame; an anvil fixed to one end of the frame; a spindle that is screwed to the other end of the frame and is advanced and retracted relative to the anvil; an encoder that detects a displacement of the spindle; a display that displays a measurement value obtained by processing a detection value detected by the encoder; a deformation detecting section that detects a deformation of the frame; a storage that stores as a compensation factor a change amount of the detection value per a unit deformation detected by the deformation detecting section; and a compensator that compensates the detection value based on a difference between a zero set-time deformation that is detected by the deformation detecting section when a command for zeroset is given and a measurement-time deformation that is detected by the deformation detecting section in measurement, and based on the compensation factor stored in the storage.

With this arrangement, in measurement, when the spindle is advanced and an object to be measured is held between the anvil and the spindle, a displacement of the spindle at that time is detected by the encoder.

In the compensator, the detection value detected by the encoder is compensated based on the difference between the zeroset-time deformation that is detected by the deformation detecting section when a command for zeroset is given and the measurement-time deformation that is detected by the deformation detecting section in measurement, and based on the compensation factor stored in the storage. In other words, since an error of the detection value of the encoder based on the difference between the zeroset-time deformation of the frame and the measurement-time deformation of the frame is compensated, repeatability of the micrometer can be improved. As a result, the measurement error can be reduced.

It is preferable that the micrometer according to the above aspect of the invention further includes a compensation factor setting section that, while the spindle is in contact with the anvil or an object to be measured by different first and second measurement forces, retrieves a first detection value and a second detection value which are detected by the encoder and a first deformation and a second deformation which are detected by the deformation detecting section, calculates the compensation factor based on a difference between the first and second detection values and a difference between the first and second deformations, and stores the compensation factor in the storage.

With this arrangement, when the spindle is brought into contact with the anvil or the object by the different first and second measurement forces, the compensation factor setting section retrieves the first detection value and the first deformation obtained when the spindle is brought into contact by the first measurement force. Moreover, the compensation factor setting section retrieves the second detection value and the second deformation obtained when the spindle is brought into contact by the second measurement force. Subsequently, the compensation factor setting section calculates the compensation factor based on the difference between the first and second detection values and the difference between the first and second deformations, and stores the compensation factor in the storage.

Accordingly, without using an exterior device (e.g., a maintenance device) dedicated for calculating the compensation factor, the compensation factor can be easily set by anyone at a low cost.

It is preferable that the micrometer according to the above aspect of the invention further includes a zeroset-time deformation updating section that updates the zeroset-time deformation detected by the deformation detecting section in the storage, every time the command for zeroset is given.

With this arrangement, when the zeroset operation is set to be conducted at a measurement start time, under environmental conditions at that time, the zeroset-time deformation detected by the deformation detecting section is updated in the storage. Accordingly, a difference between the environmental conditions at the measurement start time and environmental conditions during the measurement can be reduced. For this reason, it is not necessary to consider an influence caused by the temperature.

In the micrometer according to the above aspect of the invention, provided that the detection value detected by the encoder is denoted as e, the compensation factor is denoted as m, the zeroset-time deformation stored in the storage is denoted as fo, and the measurement-time deformation detected by the deformation detecting section in measurement is denoted as fn, it is preferable that the compensator calculates a compensated detection value denoted as e' according to $e' = e - m(fn - fo)$.

With this arrangement, the compensated detection value e' can be obtained by compensating the deformation of the frame according to the above formula.

In the micrometer according to the above aspect of the invention, it is preferable that the frame is formed in a substantially U-shape and includes: an anvil support that supports the anvil; a spindle support that projects in parallel to the anvil support and supports the spindle; and a connector that connects a base end of the anvil support and a base end of the spindle support, and the deformation detecting section is provided by a strain gauge disposed in a connecting portion between the anvil support and the connector.

With this arrangement, since the deformation detecting section is provided by the strain gauge and the strain gauge is disposed in the base portion of the anvil support of the frame, a deformation of the frame by a relatively small measurement force can be effectively detected.

In the micrometer according to the above aspect of the invention, it is preferable that the other end of the frame is provided with an inner sleeve to which the spindle is rotatably screwed, and the deformation detecting section is provided by a strain gauge disposed in the inner sleeve.

With this arrangement, since the deformation detecting section is provided by the strain gauge and the strain gauge is disposed in the inner sleeve to which the spindle is rotatably screwed, there is such an advantage as an output value of the strain gauge and the deformation of the frame approximate a linear form.

DESCRIPTION OF EMBODIMENT(S)

Figure 1:
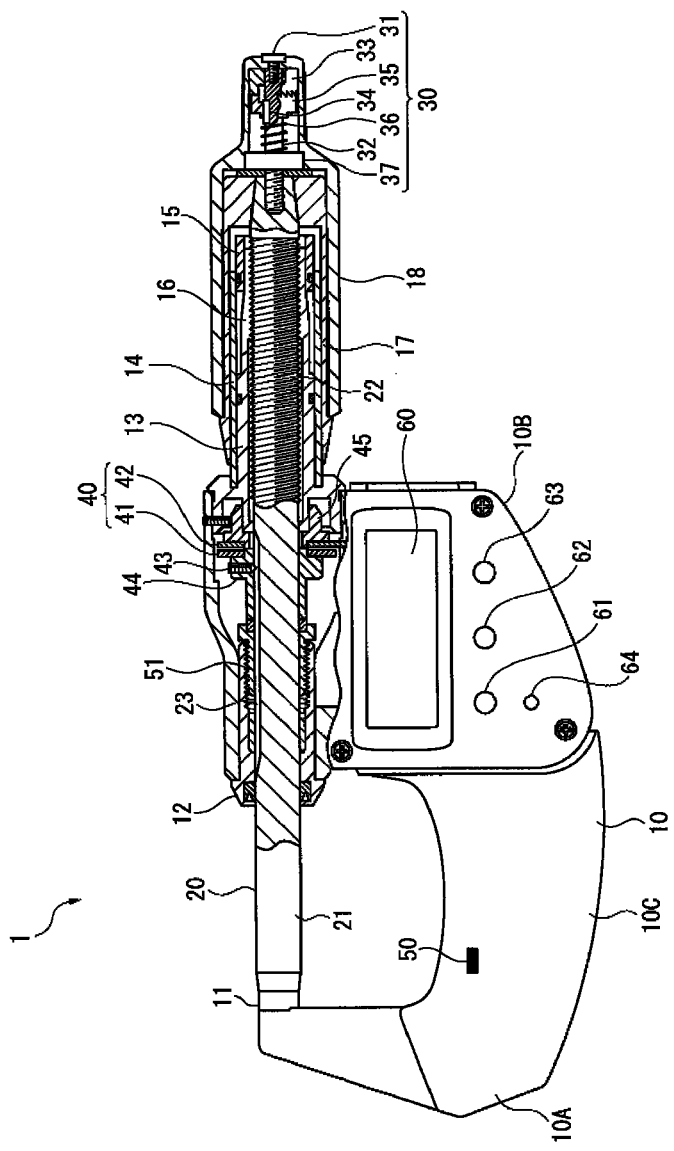
FIG. 1 is a partial cross section showing a digital micrometer according to an exemplary embodiment of the invention.

Exemplary embodiment(s) of the invention will be described below with reference to the attached drawings.
Arrangement of Digital Micrometer FIG. 1 is a partial cross section showing a digital micrometer according to an exemplary embodiment of the invention. In FIG. 1, a digital micrometer 1 includes: a substantially U-shaped frame 10; an anvil 11 fixed on an inner surface of one end of the frame 10; a spindle 20 that is provided to the other end of the frame 10 and is advanced and retracted relative to the anvil 11 while being axially displaced; an encoder 40 that is provided inside the frame 10 and detects a displacement of the spindle 20; and a display 60 that displays a measurement value obtained by processing a detection value detected by the encoder 40. The spindle 20 includes a spindle body 21 and a threaded shaft 22 which are in alignment. A cross-sectionally V-shaped key groove 23 is axially formed on an outer circumference of the spindle body 21. The threaded shaft 22 is externally threaded.

The substantially U-shaped frame 10 includes: an anvil support 10A on which the anvil 11 is fixed; a spindle support 10B that is opposed to the anvil support 10A with a predetermined distance and supports the spindle 20; and a connector 10C that connects a base end of the anvil support 10A and a base end of the spindle support 10B.

A strain gauge 50 (a deformation detecting section) is provided in a connecting portion between the anvil support 10A and the connector 10C, namely, in a base portion of the anvil support 10A.

Not only the display 60 but also a power on-off switch 61, a zeroset switch 62, a hold switch 63, a compensation factor setting switch 64 and the like are provided on a front side of the spindle support 10B. A sleeve 12 is provided inside an end of the spindle support 10B while a first end of an inner sleeve 13 and a first end of an outer sleeve 14 are held by an outer side of the end of the spindle support 10B, the inner sleeve 13 and the outer sleeve 14 forming a double cylinder structure.

The first end of the inner sleeve 13 is held by the frame 10 while an inner circumference of a second end of the inner sleeve 13 is internally threaded and screwed with the threaded shaft 22 of the spindle 20. An outer circumference of the second end of the inner sleeve 13 is externally threaded and screwed with a tapered nut 15. In a predetermined position of the externally threaded portion of the inner sleeve 13, three slits are formed to provide a three-way split portion 16. When the tapered nut 15 is rotated to be advanced and retracted in the axial direction of the inner sleeve 13, a degree of tightness of the three-way split portion 16 is changed to change an inner diameter of the inner sleeve 13, so that a degree of fitting between the spindle 20 and the inner sleeve 13 is adjustable.

On the outer circumference of the outer sleeve 14, a cylindrical thimble 17 is connected to an outer end of the spindle 20 (an end opposite to the anvil 11) via a support shaft 32 and a flange 37. Accordingly, when the thimble 17 is rotated, the spindle 20 integrally connected to the thimble 17 is also rotated, so that the spindle 20 is advanced and retracted in the axial direction and relative to the anvil 11.

An operation sleeve 18 rotatable around the spindle 20 is provided in a manner to cover an outer circumference of the thimble 17 and the outer end of the spindle 20. A constant pressure mechanism 30 that runs idle when a predetermined load or more is applied on the spindle 20 is provided between an outer end of the operation sleeve 18 and the outer end of the spindle 20.

The constant pressure mechanism 30 includes: the support shaft 32 having one end screwed in the outer end of the spindle 20 and having the other end that rotatably supports the operation sleeve 18 via a screw 31; a first ratchet wheel 33 fixed to an inner circumference of the operation sleeve 18; a second ratchet wheel 35 engaged with the first ratchet wheel 33 and provided to the support shaft 32 via a key 34 in a manner incapable of rotating around the support shaft 32 and displaceable in the axial direction of the support shaft 32; a helical compression spring 36 that biases the second ratchet wheel 35 toward the first ratchet wheel 33; and a flange 37 that supports one end of the helical compression spring 36 and is fixed to the support shaft 32.

Accordingly, when the operation sleeve 18 is rotated, the first ratchet wheel 33 is rotated together with the operation sleeve 18. Since the first ratchet wheel 33 is engaged with the second ratchet wheel 35, the second ratchet wheel 35 is also rotated. When the second ratchet wheel 35 is rotated, the support shaft 32 is rotated via the key 34, whereby the spindle 2 in which the support shaft 32 is screwed and the thimble 17 integrated with the spindle 2 are also rotated together with the operation sleeve 18.

On the other hand, under a predetermined load or more applied on the spindle 20, the second ratchet wheel 35 is difficult to rotate. Thus, when the operation sleeve 18 is further rotated to rotate the first ratchet wheel 33, the second ratchet wheel 35 is moved toward the helical compression spring 36 along the key 34 against the helical compression spring 36. In other words, a rotation power of the first ratchet wheel 33 is not transmitted to the second ratchet wheel 35 and therefore the operation sleeve 18 runs idle, thereby keeping constant pressure.

The encoder 40 is an electromagnetic-induction-type encoder, which includes a rotor 41 that rotates in a circumferential direction of the spindle 20 and a stator 42 that faces the rotor 41 with a predetermined gap therebetween and is fixed to the frame 10.

The rotor 41, which is formed substantially in a doughnut-shaped plate, includes an electrode pattern of a coil (not shown) on a surface near the stator 42. A surface of the rotor 41 opposite to the stator 42 is held by a rotor bushing 44 (rotor holding member). The rotor bushing 44 includes an engaging key 43 engageable with the key groove 23 of the spindle 20. A position adjusting screw 51 for restraining the rotor bushing 44 from moving in a direction opposite to the stator 42 and in the axial direction of the spindle 20 is provided opposite to the stator 42 across the rotor bushing 44.

The stator 42 includes a substantially doughnut-plate-shaped stator ring provided on the outer circumference of the spindle 20 and a plate-shaped stator extension provided on an outer circumference of the stator ring to be stretched toward the inside of the frame 10. The stator ring has an electrode pattern formed by a transmission coil and a receiver coil for detecting a rotation angle of the rotor 41 by electromagnetically coupling to the electrode pattern of the rotor 41.

A surface of the stator ring opposite to the rotor 41 is held by a stator bushing 45 (stator holding member). One end of the stator bushing 45 holds the stator 42 while the other end of stator bushing 45 is fit to an outer circumference of an inner end of the inner sleeve 13.

The stator extension is fixed to the inside of the frame 10.

Figure 2:
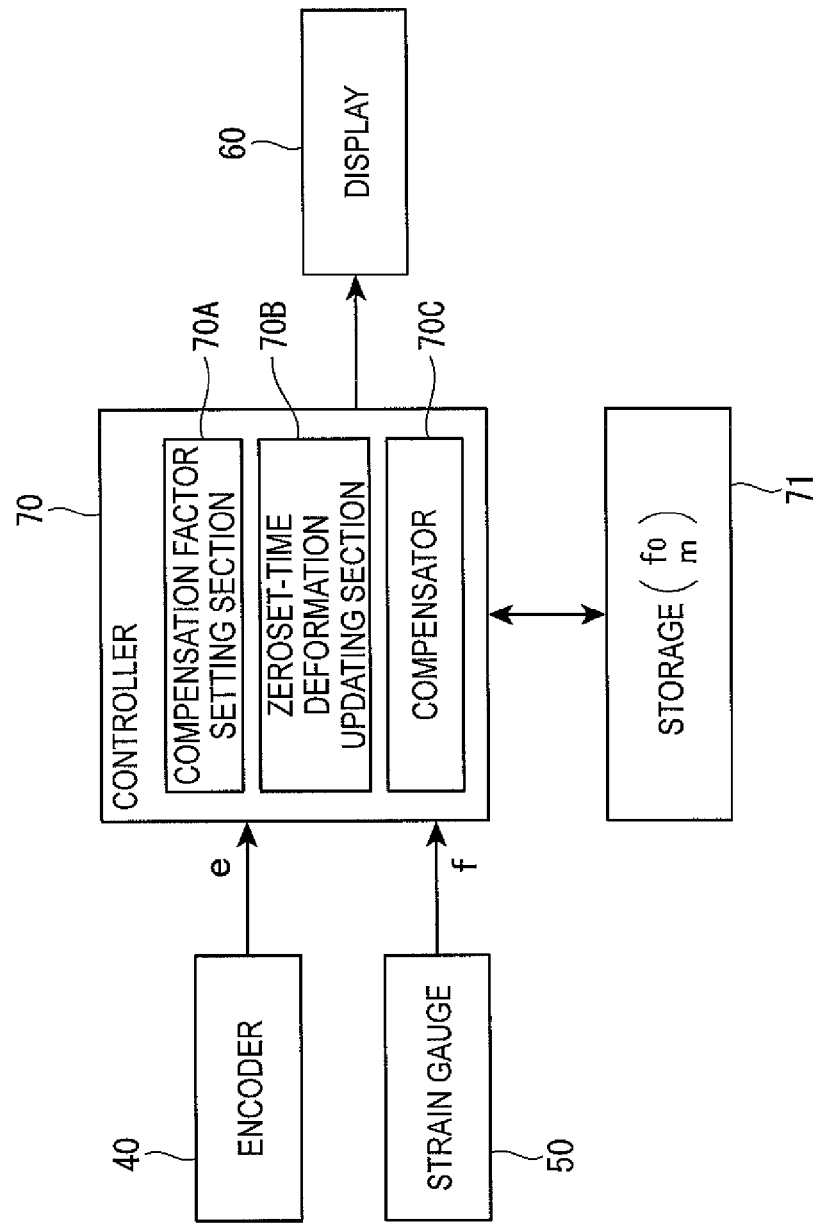
FIG. 2 is a control block diagram of the above exemplary embodiment.

FIG. 2 is a control block diagram showing the digital micrometer according to this exemplary embodiment.

A detection value e detected by the encoder 40 and a deformation f detected by the strain gauge 50 are given to the controller 70. The controller 70 is connected with a storage 71 as well as the display 60.

The storage 71 stores a compensation factor m as well as a deformation of the frame 10 (i.e., zeroset-time deformation fo) detected by the strain gauge 50 when a command for zeroset is given. The compensation factor m is a change amount of the detection value by the encoder 40 per a unit deformation of the frame 10 detected by the strain gauge 50.

The controller 70 includes a CPU and the like that process the detection value e detected by the encoder 40 and display the processed detection value as a measurement value on the display 60. The controller 70 further includes a compensation factor setting section 70A, a zeroset-time deformation updating section 70B and a compensator 70C.

While the spindle 20 is in contact with the anvil 11 or the object by different first and second measurement forces, the compensation factor setting section 70A retrieves a first detection value and a second detection value which are detected by the encoder 40 and a first deformation and a second deformation which are detected by the strain gauge 50, calculates a compensation factor m based on a difference between the first and second measurement values and a difference between the first and second deformations, and stores the compensation factor m in the storage 71. Details will be described later.

The zeroset-time deformation updating section 70B sets the display value on the display 60 at "000" every time the command for zeroset is given, in other words, every time the zeroset switch 62 is pressed. Simultaneously, the zeroset-time deformation updating section 70B updates the deformation detected by the strain gauge 50, namely, the zeroset-time deformation fo in the storage 71.

The compensator 70C compensates the detection value e of the encoder 40 based on: a difference between the zeroset-time deformation fo and the deformation (measurement-time deformation fn) of the frame 10 detected by the strain gauge 50; and the compensation factor m stored in the storage 71. Specifically, a compensated detection value e' is calculated according to $$e' = e - m(fn - fo).$$

Compensation Factor Setting Operation Under Factory Default Setting

A compensation factor setting operation under a factory default setting will be conducted as follows by an operator.

Firstly, the compensation factor setting switch 64 is pressed to switch to a compensation factor setting mode.

Next, the thimble 17 is rotated to advance the spindle 20 toward the anvil 11 and bring the spindle 20 into contact with the anvil 11 by a relatively small measurement force, and, then, the compensation factor setting switch 64 is pressed.

Subsequently, the thimble 17 is further rotated to bring the spindle 20 into contact with the anvil 11 by a relatively large measurement force, and, then, the compensation factor setting switch 64 is pressed.

Figure 3:
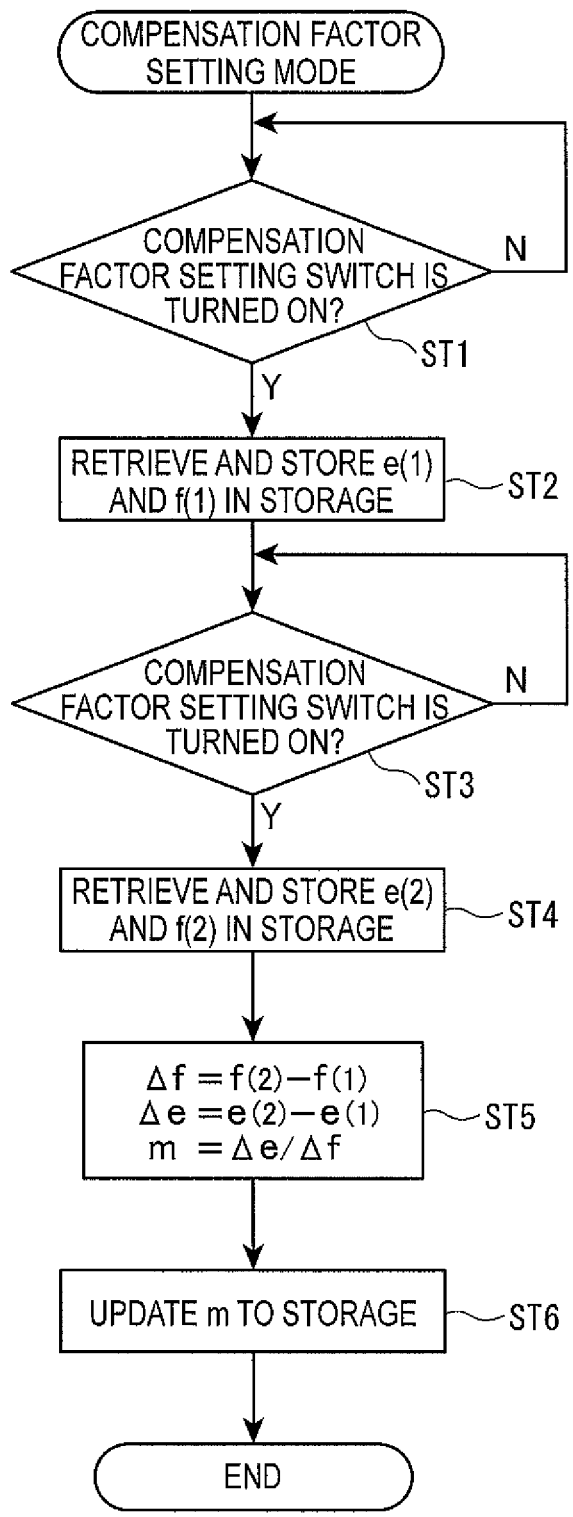
FIG. 3 is a flowchart showing a process of a compensation factor setting mode in the above exemplary embodiment.

When recognizing that the compensation factor setting switch 64 has been pressed for the first time, the compensation factor setting section 70A enters the compensation factor setting mode and executes a process of the flowchart shown in FIG. 3.

Figure 4:
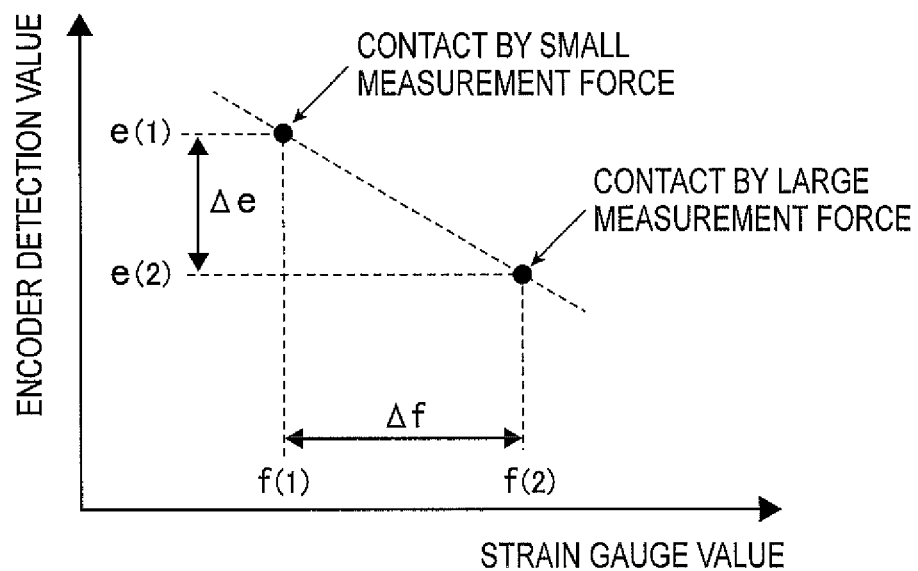
FIG. 4 illustrates the process of the compensation factor setting mode in the above exemplary embodiment.

In ST1, when the compensation factor setting section 70A recognizes that the compensation factor setting switch 64 has been pressed for the second time, the process proceeds to ST2. In ST2, the compensation factor setting section 70A retrieves a detection value e(1) and a value of the strain gauge 50 (a deformation f(1) of the frame 10) when the spindle 20 is brought into contact with the anvil 11 by the relatively small measurement force, and stores the detection value e(1) and the deformation f(1) of the frame 10 in the storage 71 (see FIG. 4).

In ST3, when the compensation factor setting section 70A recognizes that the compensation factor setting switch 64 has been pressed for the third time, the process proceeds to ST4. In ST4, the compensation factor setting section 70A retrieves a detection value e(2) and a value of the strain gauge 50 (a deformation f(2) of the frame 10) when the spindle 20 is brought into contact with the anvil 11 by the relatively large measurement force, and stores the detection value e(2) and the deformation f(2) of the frame 10 in the storage 71 (see FIG. 4).

Lastly, in ST5, based on the detection values e(1) and e(2) and the deformations f(1) and f(2) stored in the storage 71, a change amount $\Delta e$ of the detection value and a change amount $\Delta f$ of the strain gauge 50 are calculated according to $$\Delta e = e(2) - e(1)$$

$$\Delta f = f(2) - f(1).$$

Subsequently, the compensation factor m, which is a change amount of the detection value per a unit deformation of the strain gauge 50, is calculated according to $$m = \Delta e / \Delta f.$$

In ST6, the obtained compensation factor m is updated in the storage 71.

Measurement Operation

In measurement, firstly, a zeroset operation is conducted. For the zeroset operation, the operation sleeve 18 or the thimble 17 is rotated to advance the spindle 20 toward the anvil 11 and bring the spindle 20 into contact with the anvil 11, and, then, the zeroset switch 62 is pressed.

Figure 5:
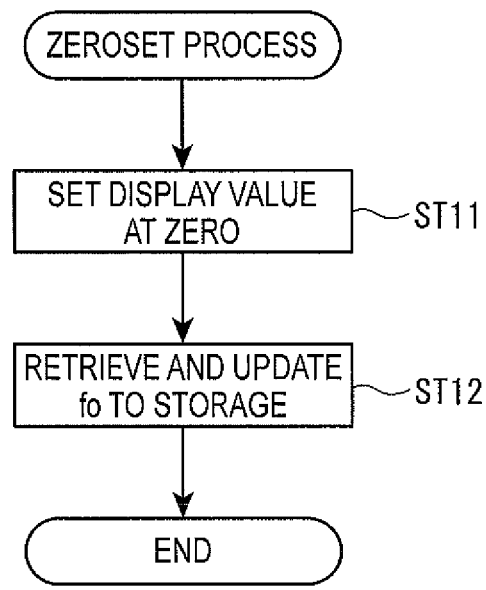
FIG. 5 is a flowchart showing a zeroset process in the above exemplary embodiment.

Then, the zeroset-time deformation updating section 70B executes a process in accordance with the flowchart shown in FIG. 5.

Firstly, in ST11, the zeroset-time deformation updating section 70B sets the display value on the display 60 at "000". In ST12, the zeroset-time deformation updating section 70B retrieves the value of the strain gauge 50, namely, the zeroset-time deformation fo, and updates the zeroset-time deformation fo in the storage 71.

After this operation, a measurement operation is conducted.

In the measurement operation, the thimble 17 is rotated to advance and retract the spindle 20 relative to the anvil 11 and bring an end surface of the spindle 20 and the anvil 11 into contact with to-be-measured portions of the object.

Figure 6:
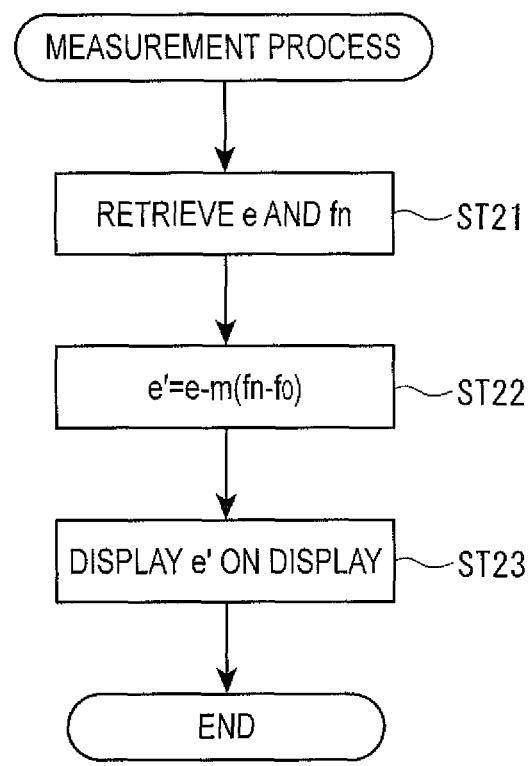
FIG. 6 is a flowchart showing a measurement process in the above exemplary embodiment.

Then, the compensator 70C executes a process in accordance with the flowchart shown in FIG. 6.

In ST21, the compensator 70C retrieves the detection value e detected by the encoder 40 and the value of the strain gauge 50 (i.e., the measurement-time deformation fn) every time the spindle 20 is displaced by a predetermined distance.

In ST22, a compensated detection value e' is calculated according to the following formula:

$$e' = e - m(fn - fo).$$

In ST23, the compensator 70C processes the compensated detection value e' and displays the obtained value as a measurement value on the display 60.

Effects of Exemplary Embodiment(s)

The compensator 70C compensates the detection value e of the encoder 40 based on the difference (i.e., the change amount Δf) between the zeroset-time deformation fo and the measurement-time deformation fn of the frame 10 and the compensation factor m stored in the storage 71. In other words, an error of the detection value e based on the difference between the deformation of the frame 10 when the command for zeroset is given and the measurement-time deformation of the frame 10 is compensated. Accordingly, repeatability of the micrometer can be improved. As a result, the measurement error can be reduced.

In the compensation factor setting mode, when the spindle 20 is brought into contact with the anvil 11 or the object by the different first and second measurement forces, the compensation factor setting section 70A retrieves the first detection value e(1) of the encoder 40 and the first deformation f(1) of the strain gauge 50 when the spindle 20 is brought into contact with the anvil 11 or the object by the first measurement force. Moreover, the compensation factor setting section 70A retrieves the second detection value e(2) of the encoder 40 and the second deformation f(2) of the strain gauge 50 when the spindle 20 is brought into contact with the anvil 11 or the object by the second measurement force. Since the compensation factor m is calculated based on the difference between the first detection value e(1) and the second detection value e(2) and the difference between the first deformation f(1) and the second deformation f(2) and is stored in the storage 71, the compensation factor can be set without using an exterior device (e.g., a maintenance device) dedicated for calculating the compensation factor. Accordingly, the compensation factor can be easily set by anyone at a low cost.

When the zeroset operation is conducted at a measurement start time, under environmental conditions at that time, the zeroset-time deformation fo detected by the strain gauge 50 is updated in the storage 71. Accordingly, a difference between the environmental conditions at the measurement start time and environmental conditions during the measurement can be reduced. For this reason, it is not necessary to consider an influence caused by the temperature.

Moreover, since the strain gauge 50 is provided in the connecting portion between the anvil support 10A and the connector 10C of the frame 10, namely, in the base portion of anvil support 10A, the deformation of the frame 10 by a relatively small measurement force can be effectively detected.

Modification

The scope of the invention is not limited to the above exemplary embodiment, but includes modifications and improvements as long as an object of the invention can be achieved.

In the above exemplary embodiment, the strain gauge 50 is provided in the connecting portion between the anvil support 10A and the connector 10C of the frame 10. However, the strain gauge 50 may be provided in any position.

Figure 7:
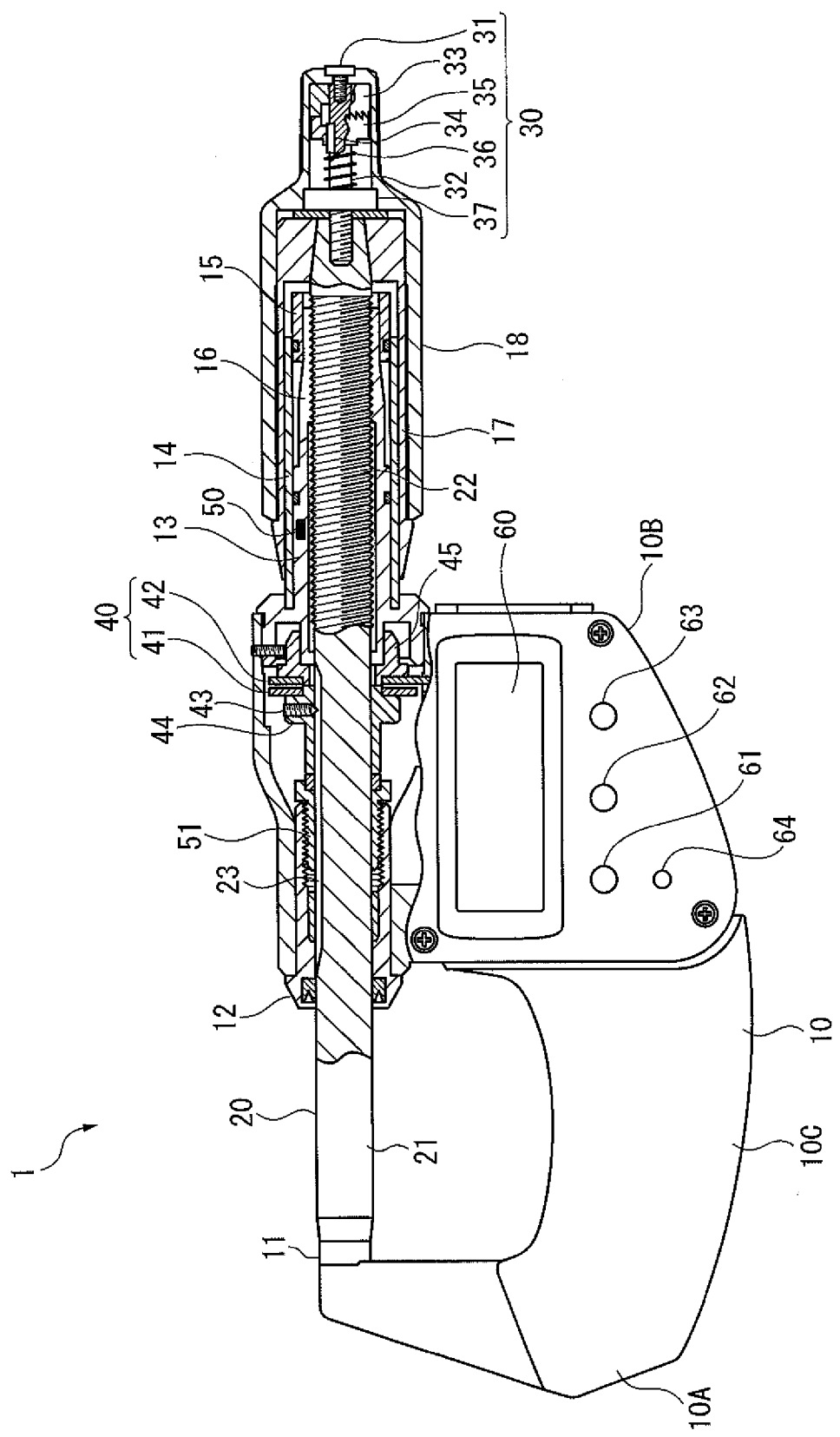
FIG. 7 is a partial cross section showing a strain gauge disposed at a different part in the digital micrometer of the above exemplary embodiment.

For instance, as shown in FIG. 7, the strain gauge 50 may be disposed in the inner sleeve 13. With this arrangement, there is such an advantage as an output value of the strain gauge 50 and the deformation of the frame 10 approximate a linear form.

In the above exemplary embodiment, in the compensation factor setting operation: the detection value e(1) of the encoder 40 and the deformation f(1) of the strain gauge 50 which are measured by the small measurement force are initially retrieved; next, the detection value e(2) of the encoder 40 and the deformation f(2) of the strain gauge 50 which are measured by the large measurement force are retrieved; and the compensation factor m is calculated based on the detection values e(1) and e(2) and the deformations f(1) and f(2). However, the order of retrieving the above values may be reversed. Specifically, the detection value e(2) of the encoder 40 and the deformation f(2) of the strain gauge 50 which are measured by the large measurement force are initially retrieved; next, the detection value e(1) of the encoder 40 and the deformation f(1) of the strain gauge 50 which are measured by the small measurement force are retrieved; and the compensation factor m is calculated based on the detection values e(1) and e(2) and the deformations f(1) and f(2).

Although the compensation factor setting operation is conducted as a factory default setting, the compensation factor setting operation may be conducted before the measurement start time in a work site.

In the above exemplary embodiment, the zeroset operation is conducted at the measurement start time, and the value of the strain gauge 50 (i.e., the zeroset-time deformation fo) is updated in the storage 71. However, the zeroset operation may not be conducted at every measurement start time. The zeroset operation may be conducted regularly (e.g., every month). Alternatively, the zeroset-time deformation fo may be stored as a fixed value in the storage 71.

The encoder 40 is not limited to the electromagnetic-induction-type encoder exemplarily described in the above exemplary embodiment. It is only required that the encoder 40 detects the relative rotation of the rotor 41 to the stator 42. For example, the encoder 40 may be an optical encoder, electrostatic encoder or the like.

What is claimed is:

1. A micrometer comprising:
a U-shaped frame;
an anvil fixed to one end of the frame;
a spindle that is screwed to the other end of the frame and is advanced and retracted relative to the anvil;
an encoder that detects a displacement of the spindle;
a display that displays a measurement value obtained by processing a detection value detected by the encoder;
a deformation detecting section that detects a deformation of the frame;
a storage that stores as a compensation factor a change amount of the detection value per a unit deformation detected by the deformation detecting section;
a compensation factor setting section that, while the spindle is in contact with the anvil or an object to be measured by different first and second measurement forces, retrieves a first detection value and a second detection value which are detected by the encoder and a first deformation and a second deformation which are detected by the deformation detecting section, calculates a value obtained by dividing a difference between the first and second detection values by a difference between the first and second deformations as the compensation factor, and stores the compensation factor in the storage; and
a compensator that compensates the detection value based on a difference between a zeroset-time deformation that is detected by the deformation detecting section when a command for zeroset is given and a measurement-time deformation that is detected by the deformation detecting section in measurement, and based on the compensation factor stored in the storage.

2. The micrometer according to claim 1, further comprising:
a zeroset-time deformation updating section that updates the zeroset-time deformation detected by the deformation detecting section in the storage, every time the command for zeroset is given.

3. The micrometer according to claim 2, wherein
provided that the detection value detected by the encoder is denoted as e, the compensation factor is denoted as m, the zeroset-time deformation stored in the storage is denoted as fo, and the measurement-time deformation detected by the deformation detecting section in measurement is denoted as fn, the compensator calculates a compensated detection value denoted as e' according to $$e'=e-m(fn-fo).$$

4. The micrometer according to claim 1, wherein
the U-shaped frame comprises: an anvil support that supports the anvil; a spindle support that projects in parallel to the anvil support and supports the spindle; and a connector that connects a base end of the anvil support and a base end of the spindle support, and
the deformation detecting section is provided by a strain gauge disposed in a connecting portion between the anvil support and the connector.

5. The micrometer according to claim 1, wherein
the other end of the frame is provided with an inner sleeve to which the spindle is rotatably screwed, and
the deformation detecting section is provided by a strain gauge disposed in the inner sleeve.

* * * * *